United States Patent [19]
Hogg

[11] 3,893,766
[45] July 8, 1975

[54] APPARATUS FOR ORIENTING GENERALLY FLAT PARTICLES FOR SLIT-SCAN PHOTOMETRY

[75] Inventor: Walter R. Hogg, Miami Lakes, Fla.

[73] Assignee: Coulter Electronics, Inc., Hialeah, Fla.

[22] Filed: June 14, 1973

[21] Appl. No.: 369,910

[52] U.S. Cl. .................. 356/36; 250/574; 356/39; 356/102; 356/246
[51] Int. Cl. .......................................... G01n 21/26
[58] Field of Search ....... 356/36, 39, 102, 103, 181, 356/208, 246

[56] References Cited
UNITED STATES PATENTS
3,661,460  5/1972  Elking et al..................... 356/246 X
3,705,771  12/1972  Friedman et al..................... 356/39
3,720,470  3/1973  Berkhan........................... 356/103 X

*Primary Examiner*—Ronald L. Wibert
*Assistant Examiner*—Matthew W. Koren
*Attorney, Agent, or Firm*—Silverman & Cass, Ltd.

[57] ABSTRACT

A flow chamber which is particularly useful in slit-scan photometry and which has a predetermined configuration for orienting generally flat oval particles such as squamous cells in the direction of fluid flow such that the maximum cross-sectional area of each particle is substantially normal to a light path traversing the flow of particles at an observing station situated along the flow path of the particles.

14 Claims, 7 Drawing Figures

APPARATUS FOR ORIENTING GENERALLY FLAT PARTICLES FOR SLIT-SCAN PHOTOMETRY

FIELD OF THE INVENTION

The present invention relates to an apparatus for orienting particles in a fluid suspension and more particularly to an apparatus for orienting generally flat particles in a proper position for scanning the particles as they pass a monitor in a slit-scan photometry instrument.

BACKGROUND OF THE INVENTION

Optical particle sensors operate on the principle of measuring the amount of light scattered or intercepted when an intensive illuminating beam is projected through a flow steam containing suspended particles. Flow cells for containing this liquid flow have been developed for accurately containing the sample liquid within the center of a circularly laminar flow of a sheath fluid. These flow cells were designed for forming a nonturbulent, laminar flowing fluid that was then caused to surround a sample-containing fluid. These flow cells allowed the exact axial positioning of the flow of sample fluid such that is passed a scanning or observing device. The above-mentioned flow cells were utilized in a slit-scan photometry device described by Wheeless, Jr. et al, in U.S Pat. No. 3,657,537 entitled, "COMPUTERIZED SLIT-SCAN CYTOFLUOROMETER FOR AUTOMATIC CELL RECOGNITION."

In the Wheeless patent, a cytofluorometer was used to give graphic fluorescent contours of a fluorochromed cell. The technique described by Wheeless allowed nuclear fluorescence to be distinguished from nonspecific cytoplasmic fluorescence that was often observed in particles such as squamous cells. The shape of the pulse was an indication of the ratio of the areas of the nucleus and cytoplasm, which is an informative index. These squamous cells are generally flat and of so-called "fried-egg shape."

The term "fried-egg shape" is used to describe squamous cells because such cells are generally circular in plan view and have a somewhat elevated nucleus which may or may not be centered. This general configuration resembles the shape of a fried egg.

The optical scanning device used in the above-described system responded to the maximum cross-sectional area of the particle perpendicular to the direction of the light beam of the scanning device. Due to the irregular shape and unpredictable orientation of the squamous cell, the cross-sectional area presented to the scanning device was found to vary widely, thereby precluding proper measuring results.

SUMMARY OF THE INVENTION

According to the invention, a flow chamber is used for orienting sample particles suspended in a sample fluid for observation by slit-scan photometry such that the particles are oriented with the maximum cross-sectional area of each particle transverse to the light beam used. The flow chamber has an entrance end and an exit end and is dimensioned so that, in the direction of fluid flow through the flow chamber, the ratio of a dimension in a first direction of the flow chamber to a dimension in a second direction of the flow chamber is constantly increasing; the first direction being transverse to the second direction and the cross-sectional area generally normal to the direction of fluid flow is decreasing gradually and monotonically so as to accelerate fluid flow monotonically in the direction of its flow through the chamber. A slit is provided along the longitudinal axis of the flow chamber located to establish a zone of least pressure, thereby more precisely arranging the sample particles for observation by slit-scan photometry.

DETAILED DESCRIPTION OF THE PREFERRED EMBODIMENT

Figure 1:
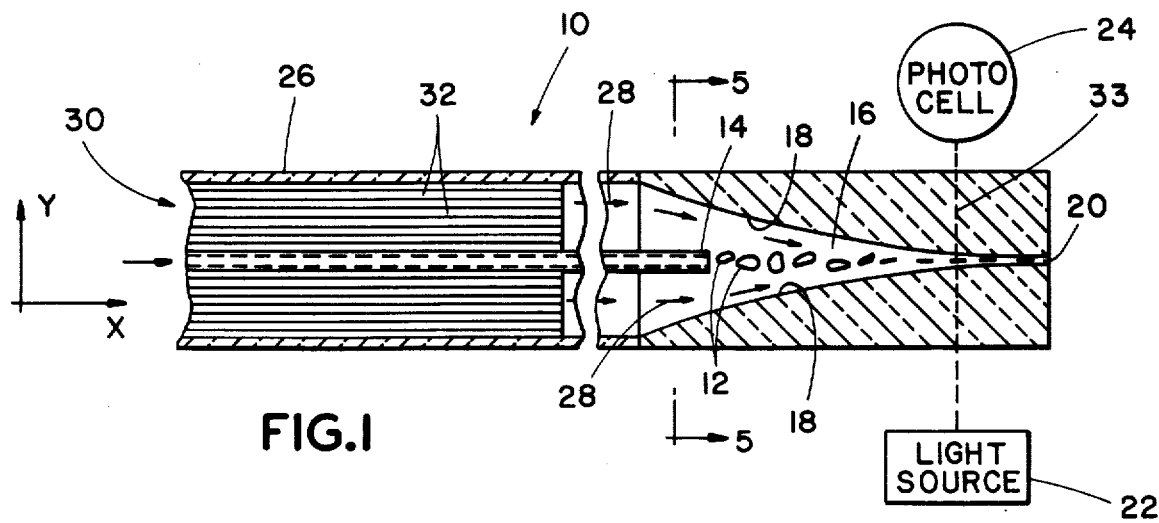
FIG. 1 is a fragmentary medial sectional view of apparatus constructed in accordance with the invention.

Referring to FIG. 1, the flow cell means embodying the invention is designated generally by the reference number 10. Sample cells, such as squamous cells 12 carried in suspension are introduced from a source of flowing sample particles, such as sample tube 14 into a flow chamber 16. The supply of the sample particles in sample tube 14 can be accomplished by any suitable means well known in the art.

Figure 2:
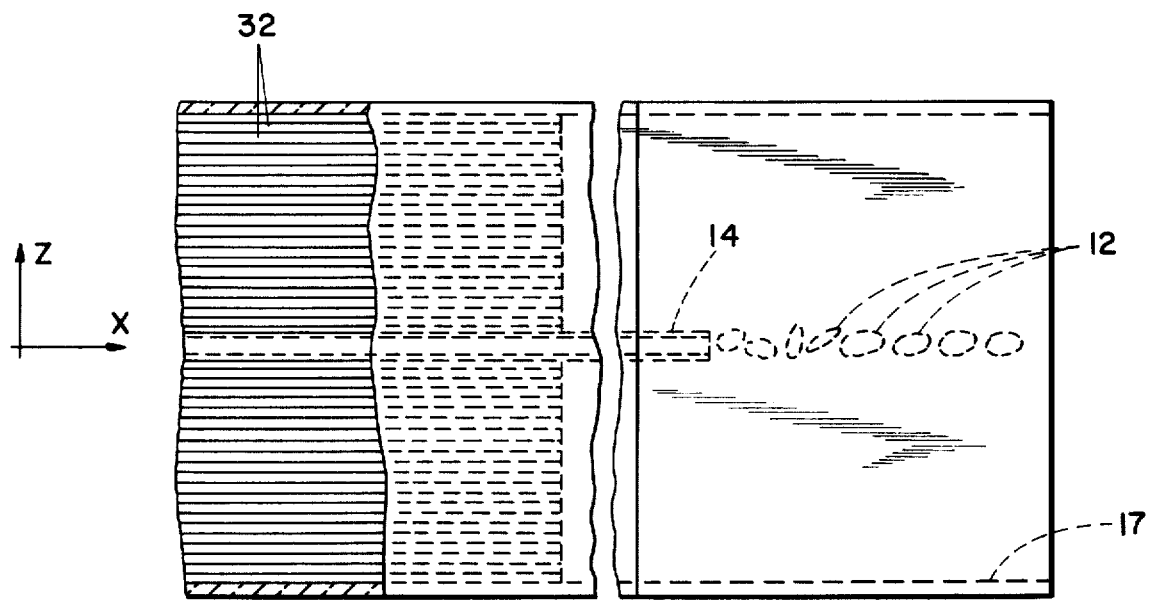
FIG. 2 is a top view of the apparatus shown in FIG. 1.

The flow chamber 16 is defined by walls 17, as seen in FIG. 2, and walls 18, seen in FIG. 1. Walls 17 are parallel and straight whereas walls 18 preferably follow exponentially narrowing curves. The walls 18 converge to an outlet 20 for fluid discharge.

The cells 12 are scanned by a light source 22 shown as providing a light at a point in the flow chamber that is essentially transverse to the direction of flow of the sample particles 12. A photoresponsive means, such as a photocell 24, is positioned opposite the light source 22 to measure the amount of light passing through the flow chamber 16. The photocell 24, which can be a photomultiplier tube, provides a reading on the amount of light transmitted. This measurement can be used to count the number of cells traversing the light beam and also can be used to measure other physical properties of the cells such as opacity and color. The photocell can also be used to measure the cross-sectional area of the sample cells. By varying the source of light or staining the sample cells, electroluminescence of the cells can be measured also to assist in identifying on the type of cell present.

Referring again to FIG. 1, a conduit 26 is connected to the flow chamber 16 for conducting fluid flow into the flow chamber. A laminar sheath flow designated by the arrows 28 is provided by sheath flow means 30 located in the bore of conduit 26. Sheath flow means 30 may comprise a plurality of tubes 32 extending through the center of conduit 26 in the direction of fluid flow, as indicated, and surrounding the sample tube 14. The tubes 32 may function to prevent turbulent flow such that the fluid entering the flow chamber 16 is "collimated" and is nonturbulent. As the sheath fluid enters flow chamber 16, the fluid takes the form of a laminar sheath fluid flow. A more detailed discussion relevant to laminar flow will be made with reference to FIG. 3.

Referring to FIGS. 1 and 2, cells 12 are shown being introduced to flow chamber 16 from tube 14 in a random manner. As they enter the observing plane formed by light source 22 and photocell 24, the cells are shown lying in a plane that is transverse to a beam of light 33 from the light source 22. As can be seen in FIG. 2, which would be the view as seen by the light source 22, each cell is oriented such that its flat side is facing the light beam, i.e., the maximum cross-sectional area of each particle is transverse to the light beam.

Figure 3:
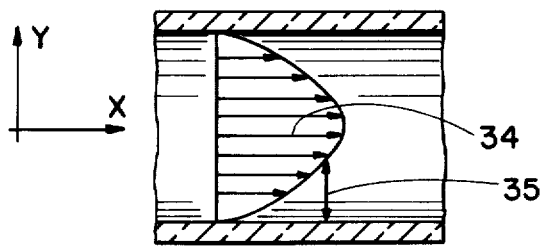
FIGS. 3 and 4 are vectorial representations of the fluid velocity at different points in the apparatus of FIG. 1.
Figure 4:
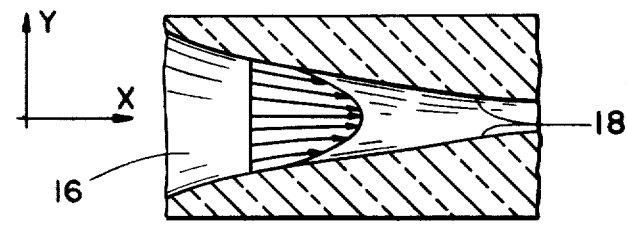

Digressing now to FIG. 3, there is illustrated a vectorial representation of a fluid that exhibits laminar sheath flow as discussed previously. Such a laminar flow would be exhibited by fluid flow 28 as it enters the flow chamber 16. The horizontal arrows represent the vector velocites at the different locations across the conduit 26 comprising sheath flow in a parallel wall conduit, with the arrows being parallel, a typical one of which is designated 34. The locus of these vectors is a parabola as shown, the distance of any vector from a wall being typically as indicated at 35, this being the distance of the vector 34 from the wall. Once the laminar flow enters the flow chamber 16, vector flow as represented in FIG. 4 would result. The fluid closest to walls 18 of flow chamber 16 have their velocities changed by the monotonically changing width of walls 18. The velocity of the fluid within the flow chamber 16 now has a Y component of velocity imputed to it by the walls 18; the Y component of velocity decreasing in the fluid as the distance from the walls 18 increase until the velocity of the fluid in the center of fluid flow has approximately no Y component of velocity. In accordance with Bernoulli's principle, the fluid in the center of fluid flow in FIG. 4 will have the greatest velocity and the pressure at the center of fluid flow will be the least. Those cells located out of the center of fluid flow will have a Y component of fluid pressure acting on it to orient it towards the center of fluid flow.

When sample fluid is introduced isokinetically into the center of a laminar flow, similar to that shown in FIG. 3, the center flow will remain in the center not crossing any planes of laminar flow. It should be understood that laminar flow can be approximated without the use of tubes 32 if a slow velocity fluid is introduced into a substantially infinitely long conduit prior to entering the flow chamber 16 of cell 10. The converging configuration of walls 18 of flow chamber 16 is such as to cause a constant acceleration of the flow of fluid toward outlet 20. The substantially infinite width of the cross section of the flow chamber near the sensing zone as compared to its height causes the flow of fluid to be not only laminar, but planar-laminar. The substantially infinite width is provided by a slit 36 centered on a longitudinal axis of least pressure and operates further to decrease the effect of a longitudinal wall on the fluid flow.

Figure 5:
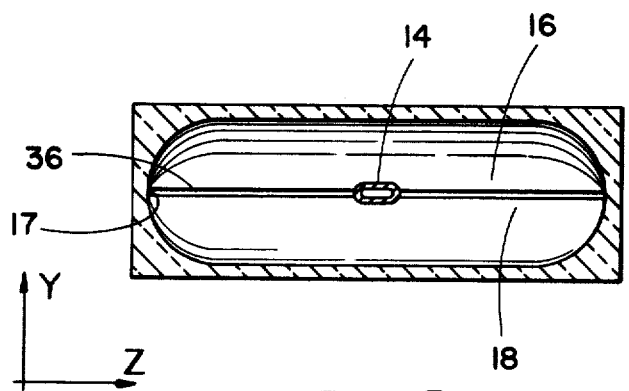
FIG. 5 is a sectional view taken along the line 5—5 of FIG. 1 and in the general direction indicated.

Referring to FIG. 5, slit 36 can be seen extending along the full width of the flow chamber 16 and along the full width of the flow chamber, as shown in FIG. 2. The slit 36 extends in a direction which is approximately perpendicular to the plane of the light beam emanating from light source 22. This slit provides an enhanced axial plane of increased velocity which, by Bernoulli's principle, forms a plane of least pressure, thereby providing optimized particle orientation such that the particle assumes a position in which the flat side of the particle is transverse to the beam 33 from light source 22 of FIG. 1. The axial region of least pressure that is formed by the slit 36 in the walls 17 of flow chamber 16 effectively provides a zero pressure gradient in a direction perpendicular from the axial center of fluid flow towards the walls 17. The walls formed by slit 36 are farthest from the axial center of fluid flow and have negligible effect upon the fluid flow.

Figure 6:
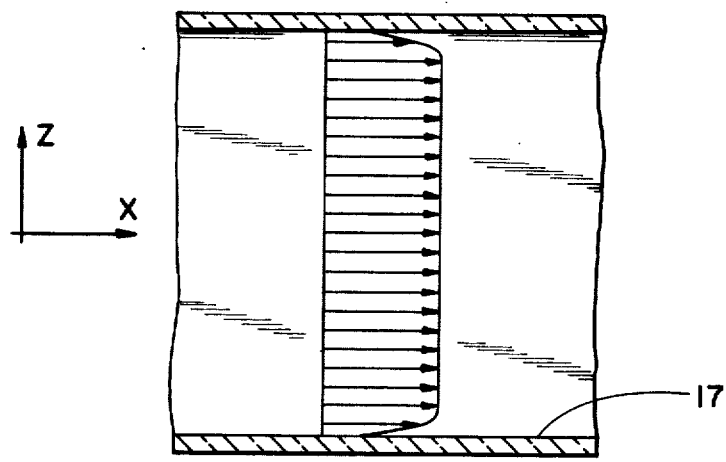
FIG. 6 is a vectorial representation of the fluid velocity along the longitudinal axis of the apparatus of FIG. 1.

FIG. 6 is a vectorial representation of the velocities in the flow chamber 16 of FIG. 5 centered along the flow chamber's longitudinal axis and parallel to slit 36 of FIG. 5. As can be seen, the velocity along this region is approximately constant along the length of slit 36 thereby representing a region of least pressure change, as described above.

It is believed that when a particle is in the flow chamber 16, the fluid in contact with the forward or leading edge of the particle will be moving faster than the fluid in contact with the back or trailing edge of the particle. This is believed to apply a tension on the particle which tends to align the particle in the direction of flow. In addition, any particle which is tilted to the direction of the fluid flow is turned by the component of fluid velocity perpendicular to the direction of flow at the center of the flow chamber since, it is believed, due to the decreasing spacing of the chamber walls 18, the inwardly directed velocity component of fluid flow which is greater downstream than upstream is produced perpendicular in the direction of fluid flow off axis. These perpendicular velocity components are zero in the center of the flow chamber. The particles will then orient themselves along this axis of least pressure as described above wherein the plane formed by the maximum cross-sectional area of the flat-shaped particles will lie in a plane parallel to the axial plane of least pressure and orthogonal to beam 33 from light source 22.

The sectional view of FIG. 5 shows the entrance to the flow chamber 16. The entrance to the flow chamber is constructed to form an elongated oblong configuration similar to that of the sample squamous cells that are to be scanned. The sample tube 14 is shown positioned in the center of the flow chamber and having the elongated oblong configuration of the flow chamber 16 and axially centered within the chamber.

Figure 7:
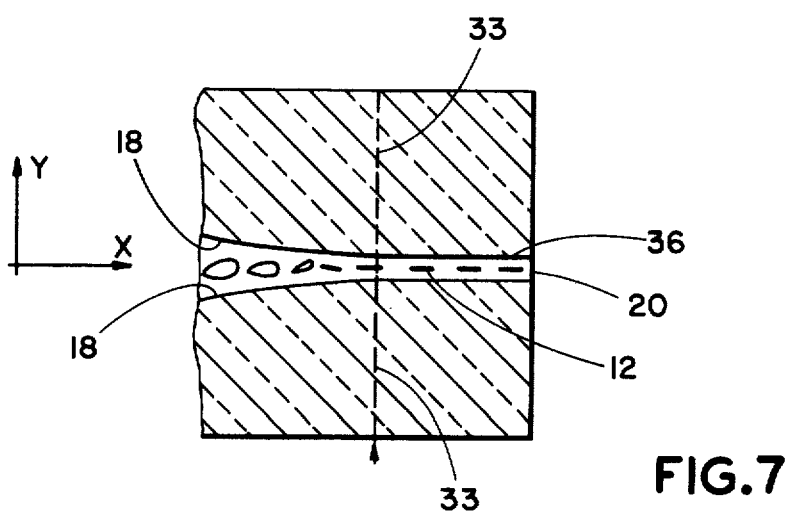
FIG. 7 is an enlarged fragmentary detail illustrating a portion of the apparatus shown in FIG. 1.

Sample squamous cells that are ejected from tube 14 into the flow chamber 16 will be on the center of the flow chamber as described above; the walls farthest away from the center providing a logitudinal axial region of least pressure. As stated above, it is believed that the fluid pressure increases as the distance from the axial center of flow increases thereby pushing cells that are tilted or not in the plane of symmetry towards the plane of symmetry due to the increase of pressure on points of the cells farthest from the plane of symmetry. Measurements are then made on the cells by projecting a cylindrical lens focused light beam 33 transverse to the direction of flow as shown in FIG. 7. This also is described in the previously mentioned Wheeless et al. patent. The light beam 33 intercepts the cells 12 at a point at which walls 18 are still tapering to orifice 20. When they reach the light beam, the "fried-egg" shape squamous cells are oriented in the center of the flow stream in a longitudinal direction extending towards the axis of least pressure at approximately a right angle to beam 33. As a result, the maximum cross-sectional area of each cell is presented to beam 33. This provides the desired efficient results in measurements by slit-scan photometry heretofore not realized.

After emerging from exit port 20, the discharged stream may be deposited on a sheet for further individual particle investigation or routed through appropriate plumbing to waste or recycling means.

What it is desired to be secured by Letters Patent of the Unites States is:

1. A flow chamber for orienting sample particles suspended in a sample fluid for observation by slit-scan photometry, said flow chamber having an entrance for receiving the sample fluid and an exit for fluid discharge, said flow chamber being configured so that the ratio of a first dimension of the flow chamber to a second dimension of the flow chamber is monotonically increasing in the direction of sample fluid flow, the first dimension being transverse to the second dimension, and the cross-sectional area of said flow chamber generally normal to the direction of fluid flow is configured to decrease gradually and monotonically in the direction of fluid flow such that fluid flow within said flow chamber is caused to accelerate gradually and monotonically and observation means for transmitting a light beam through said flow chamber located at a point prior to said exit sectional area of the flow chamber ceases to decrease and said acceleration is substantially terminated.

2. Apparatus for orienting sample particles suspended in a fluid for observation by slit-scan photometry comprising:
   a flow chamber;
   means for introducing the fluid suspension into the axial center of said flow chamber;
   means for producing a flow of sheath fluid for surrounding said sample fluid and producing a planar laminar flow;
   said flow chamber having walls configured in the direction of fluid flow therethrough such that said fluid suspension is caused to accelerate gradually and monotonically; said walls narrowing to form an exit for said fluid suspension located at a point approximately in the center of the fluid flow, and observation means for transmitting a light beam through the flow chamber located at a point prior to said exit adjacent a location where said narrowing of the walls is ended and said acceleration would be substantially terminated.

3. Apparatus as claimed in claim 2 wherein said flow chamber has an entrance opposite said exit and said exit has an elongated oblong configuration.

4. Apparatus as claimed in claim 3 wherein said flow chamber includes a slit which locates a longitudinal plane thereof which provides a low pressure zone along said longitudinal plane.

5. Apparatus as claimed in claim 4 wherein said exit comprises said slit extending in a first direction across said entrance port and perpendicular to a second direction of said entrance port.

6. Apparatus as claimed in claim 2 wherein said walls taper exponentially in the direction of fluid suspension flow.

7. Apparatus as claimed in claim 2 wherein said means for introducing said fluid suspension includes a sample tube extending into said flow chamber along said axial center.

8. Apparatus as described in claim 7 wherein said means for producing said sheath fluid flow includes means for producing smooth, nonturbulent flow of the sheath fluid through said flow chamber, comprising a plurality of tubes extending in the direction of fluid flow such that said sheath fluid is laminar within the entrance port of said flow chamber.

9. Apparatus for orienting sample particles suspended in a sample fluid for observation by slit-scan photometry, comprising:
   a. flow cell means;
   b. conduit means connected to the flow cell means for conducting a fluid flow in the flow cell means;
   c. sheath liquid flow means for producing a flow of sheath fluid through the conduit means and the flow means;
   d. sample flow means for introducing the sample fluid into the sheath fluid flow;
   e. said flow cell means including; a flow chamber having an entrance for receiving the sample fluid and the sheath fluid, and an exit for fluid discharge, said flow chamber configured along a first height axis perpendicular to the flow of said sample fluid through said flow chamber so that said sheath fluid flow is accelerated gradually and monotonically in said flow direction; and
   said flow chamber configured along a second width axis perpendicular to both the flow of sample fluid and said first axis forming a slit through said flow chamber such that there is negligible effect upon the flow of said sample fluid by said flow chamber along said second axis;
   said flow chamber having walls configured in the direction of sample fluid flow through said flow chamber to narrow along said first axis and form an exit for said sample fluid;
   the ratio of said flow chamber's width to height in the direction of sample fluid flow monotonically increasing and the cross-sectional area formed by said height and width decreasing gradually and monotonically in the direction of sample fluid flow; and
   means for observing said sample particles in said flow chamber at a point prior to said exit.

10. Apparatus as claimed in claim 9 wherein the entrance of said flow chamber is of an elongated oblong configuration and substantially centered in the sheath fluid flow.

11. Apparatus as claimed in claim 9 including:
   means for producing smooth, nonturbulent flow of the sheath fluid flow through said flow cell, said means for producing including a plurality of tubes extending in the direction of fluid flow, said sample flow means including a tube extending through the center of said means for producing so that approximate laminar flow is produced as said sheath fluid enters said flow chamber.

12. The apparatus as claimed in claim 9 in which the flow chamber configuration along said second width axis is approximately constant.

13. In an apparatus for slit-scan photometry wherein generally flat sample particles suspended in a sample fluid are injected through a sample flow tube into the center of a planar laminar flowing fluid a flow chamber for orienting said particles such that the maximum cross-sectional area of the particles are oriented in a direction transverse a light beam used in observing said sample particles, said flow chamber comprising;
an entrance;
an exit opposite said entrance in the configuration of a slit extending in a direction across the longitudinal plane of said flow chamber and perpendicular to the width of said entrance,
said flow chamber having walls configured in the direction of sample fluid flow through said flow chamber to narrow such that the laminar flowing fluid is caused to accelerate gradually and monotonically.

14. A flow chamber as described in claim 13 wherein said sample flow tube extends through the center of said entrance of said flow chamber.

* * * * *

UNITED STATES PATENT AND TRADEMARK OFFICE
CERTIFICATE OF CORRECTION

PATENT NO. : 3,893,766
DATED : July 8, 1975
INVENTOR(S) : WALTER R. HOGG

It is certified that error appears in the above—identified patent and that said Letters Patent are hereby corrected as shown below:

Col.1, line 24, change "is" to --it--; Col. 5, lines 27-29, delete "sectional area of the flow chamber ceases to decrease and said acceleration is substantially terminated"; Col.5, lines 47-49, delete "adjacent a location where said narrowing of the walls is ended and said acceleration would be substantially terminated "

Signed and Sealed this seventh Day of October 1975

[SEAL]

Attest:

RUTH C. MASON
Attesting Officer

C. MARSHALL DANN
Commissioner of Patents and Trademarks